United States Patent Office 3,159,228
Patented Dec. 1, 1964

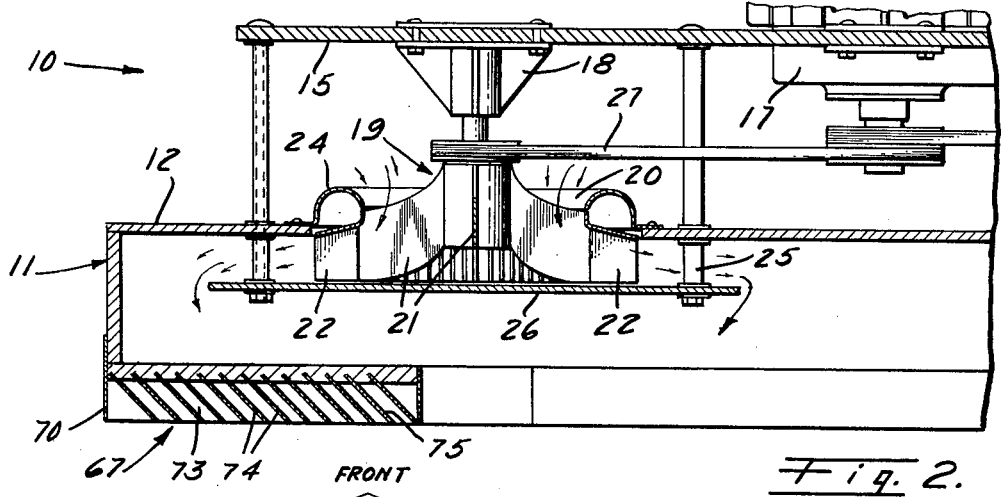
Fig. 2.
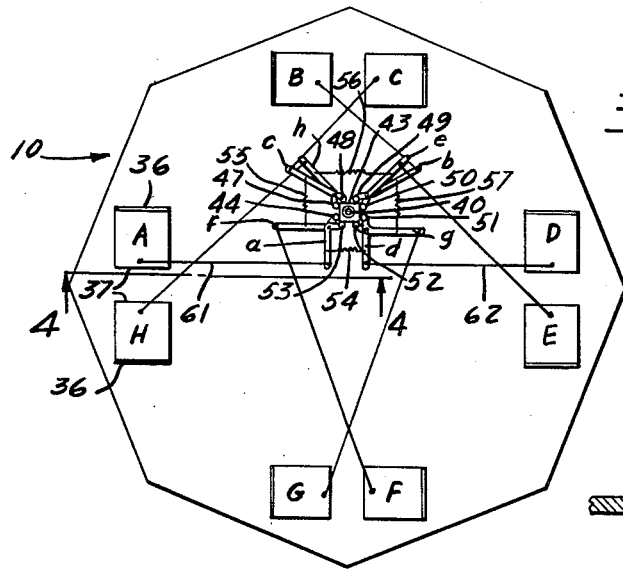
Fig. 3.
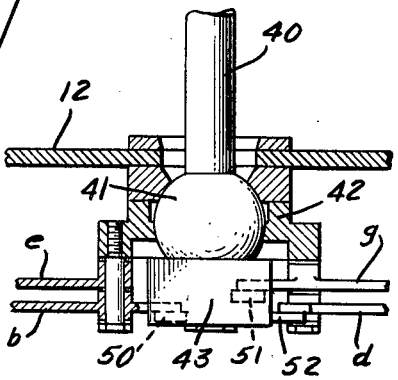
Fig. 5.
Fig. 4.
Joe L. Byrne,
James L. Dooley,
INVENTORS.
WHANN & McMANIGAL
Attorneys for Applicants.

3,159,228
DYNAMIC SEAL FOR AIR SUSPENSION VEHICLE
Joe L. Byrne, Gardena, and James L. Dooley, Santa Monica, Calif., assignors to McCulloch Corporation, Los Angeles, Calif., a corporation of Wisconsin
Filed Feb. 27, 1961, Ser. No. 91,673
8 Claims. (Cl. 180—7)

This invention relates to air suspension vehicles and, more particularly, to a dynamic seal for such vehicles to reduce the rate at which air leaks from the underside of the vehicle when it is airborne.

In air suspension or ground effect vehicles, the vehicle is lifted off the ground or water by the building up of air pressure on the underside of the vehicle, that is, between the latter and the surface over which it is suspended. The pressure build up on the underside of the vehicle is generally created by pumping air from the atmosphere through the vehicle by means of high speed fans or turbine-type compressors. Since the height to which ground effect vehicles can be lifted, for a given amount of pumping power, is an inverse function of the rate at which air escapes from the underside of the vehicle, past the peripheral edges, and back to the atmosphere, it is desirable that the rate of air escape be reduced by a sealing means along the periphery of the vehicle.

In the prior art ground effect vehicles, the sealing means therein have provided inadequate resistance to the air passing from under the vehicle and returning to the atmosphere. According to the present invention, a dynamic peripheral seal on the underside of the vehicle is provided such as to cause the outwardly moving or leaking air to form strong energy-consuming vortexes adjacent the peripheral edges so as to greatly reduce the leakage rate for a given lift height. Consequently, the present invention provides the advantage of enabling the vehicle to be lifted to a greater height for a given amount of pumping power than was heretofore possible, or the vehicle may be lifted to the same height as a prior art vehicle but with a substantially reduced amount of pumping power. It has been found that the present invention provides as much as a 70% reduction in leakage rates or, in other words, the leakage rates achieved are as low as 30% of that which would occur in a vehicle having a normal converging nozzle formed along its peripheral edges.

It is an object of the present invention to provide an improved seal for reducing the rate at which air leaks from the underside of a ground effect vehicle when it is airborne.

It is another object of the present invention to provide in an air suspension vehicle a dynamic seal which causes the leaking air to form strong energy-consuming vortexes at the peripheral edges of the vehicle to greatly reduce the required pumping power for a given lift height.

It is still another object of the present invention to provide in a ground effect vehicle an improved seal which will permit the vehicle to be lifted to a greater height for a given amount of pumping power than was heretofore possible.

It is a further object of the present invention to provide a dynamic seal along the peripheral edges of a ground effect vehicle so as to cause the air moving outwardly from the underside of the vehicle to form alternate oppositely rotating vortexes, each vortex supplementing and augmenting the one on either side of it in such a manner so as to provide the greatest possible resistance to the escaping air.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIG. 2 is a sectional view of a portion of the vehicle, taken substantially as indicated by the line 2—2 of FIG. 1;

FIG. 3 is a schematic plan view of the propelling and steering control system;

FIG. 4 is a schematic sectional view, taken substantially as indicated by the line 4—4 of FIG. 3;

FIG. 5 is an enlarged sectional view of the lower end of the control handle, taken as indicated by the line 5—5 of FIG. 1;

FIG. 6 is a fragmentary view of the underside of the vehicle, shown in FIG. 1, illustrating the peripheral seal according to the present invention;

FIG. 7 is a fragmentary view of a portion of the peripheral seal, shown in FIG. 6, looking upwardly and outwardly toward the peripheral edge of the vehicle;

FIG. 8 is a fragmentary sectional view of the seal structure, taken as indicated by the line 8—8 of FIG. 7; and FIG. 9 is a fragmentary sectional view of the seal structure, taken substantially as indicated by the line 9—9 of FIG. 8.

Figure 1:
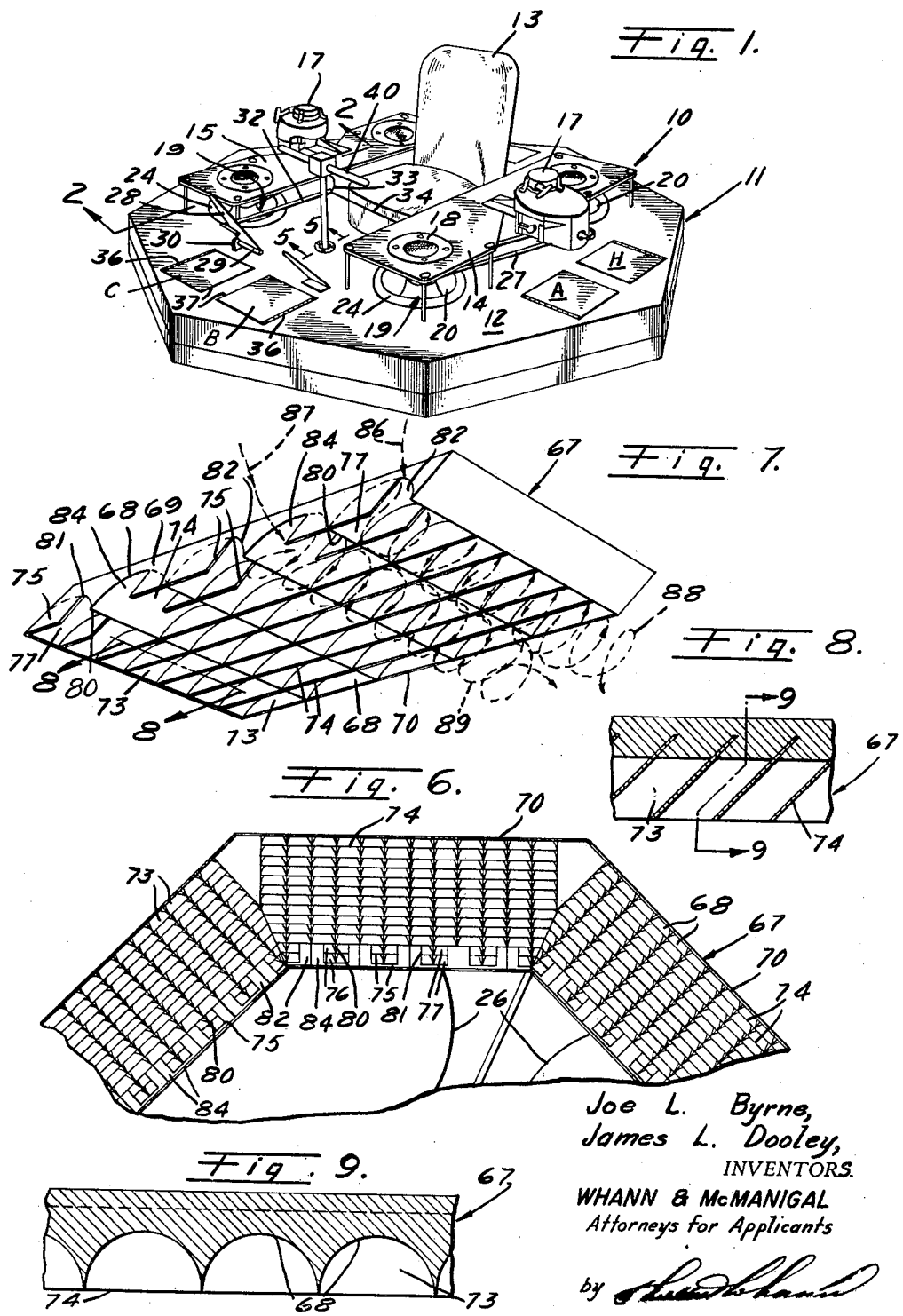
FIG. 1 is a perspective view of a ground effect vehicle illustrating the upper side thereof.

Referring again to the drawings, there is illustrated in FIG. 1 a ground effect vehicle 10 having a body 11. The upper or platform surface 12 serves as the operating platform and supported centrally therein is the operator's seat 13. On opposite sides of the seat are frames 14 and 15, supported upwardly from the surface 12.

Each frame supports motors or gasoline engines 17 which supply the driving power for the vehicle. Mounted on the frames adjacent their opposite ends, by means of brackets 18, as best seen in FIG. 2, are impellers 19. The hubs and shafts of the four impellers extend upwardly of surface 12 through air inlets 20 which provide air passageways from the upper portion of the vehicle to its underside. Each impeller has four circumferentially spaced air inlet webs 21, and extending radially outwardly from them are peripheral discharge vanes 22.

Secured to the platform surface 12 around each of the air inlets 20 are annular, inverted U-shaped members 24, extending immediately radially outwardly of the inlet webs 21, and extending immediately above the discharge vanes 22, to guide the discharged air to the underside of the vehicle. Supported from the underside of the platform 12 by means of rods 25 under each inlet 20 and directly under each impeller, is a circular baffle 26. The baffles direct the flow of air from the impellers horizontally to aid in creating a pressure build-up between the entire underside of the vehicle and the surface over which the vehicle is to be airborne. Each of the impellers is driven by means of a belt 27 extending from the respective motor shaft to the respective impeller shaft. The motors are throttled by the foot rest 28, hinged at 29 to a bracket 30, and which is connected by cables 32, 33 and 34 to the respective motors.

Referring now to FIGS. 1, 3, 4 and 5, adjacent the periphery of the vehicle, forwardly of the operator's seat, to the rear thereof, and on each of the sides is a pair of upwardly opening flaps designated as A, B, C, D, E, F, G and H. Each of the flaps is secured to the surface 12 at an outer end thereof by a hinge 36 so that the ends 37 of each, opposite the hinged end in each pair, are juxtaposed.

The handle 40, extending upwardly from the platform 12, forwardly of the operator's seat, has a ball 41 secured to its lower end below the platform, the ball being rotatably seated in a spherical-surfaced socket 42. At the lower end of the ball is a rectangular block cam 43, and in contact with the vertical sides thereof are roller cam followers 44, 47, 48, 49, 50, 51, 52 and 53 on the ends of bell cranks *a, f, c, h, e, b, g* and *d*, respectively. Each pair of cam followers, such as 53 and 44, is on a pair of the bell cranks, such as *a* and *f*, having a common pivot so that one of the cam followers makes contact with the cam 43 on one face adjacent one of its vertical corners, and the other of the pair on the common pivot makes contact with an adjacent vertical face of the cam. Springs 54, 55, 56 and 57 bias the outer legs of cranks *a* and *d*, *f* and *c*, *h* and *e*, and *b* and *g* toward each other, respectively. Each of the outer ends of the cranks is connected to wires, such as 61 and 62, shown schematically in FIG. 3, connecting flap A and flap D, respectively. In FIG. 4, the wire 61 is shown in a schematic side view, extending around pulley 63 and having its end 64 connected to the underside of flap A adjacent its free end 37. It thus may be seen that the spring 54, between the cranks *a* and *d*, holds the wires 61 and 62 taut so as to hold the flaps A and D in a normally closed position. Each of the other wires is similarly arranged so as to hold the corresponding other flaps in their closed positions.

Referring now to FIG. 6, extending inwardly and substantially coextensive with the periphery of the vehicle is a dynamic seal structure, generally designated as 67. For ease of construction, the seal is made in eight peripheral sections, three of which are shown in FIG. 6, and to accommodate them the vehicle body is conveniently made so as to have an octagonal configuration. As may be best seen in FIGS. 7, 8 and 9, each section of the seal is constructed of a multiplicity of rows 68 of semicircular reentrant portions 73 extending outwardly toward the periphery of the body. As shown in FIG. 7, in which a portion of a section of the seal is viewed, looking upwardly and outwardly from the underside of the vehicle, the inner ends of the rows 68 are shown terminating at wall surface 69, and the outer ends of the semicircular, downwardly facing rows 68 terminate at the peripheral wall 70.

Individual, downwardly facing semicircular bucket or cup-like re-entrant portions 73 are formed by transverse plates 74, spaced across the rows, for the length of each section of the seal. In the embodiment shown, the plates 74 are substantially perpendicular to the direction of the rows and extend upwardly and outwardly from the underside of the seal at approximately an angle of 45°. It has been found that for satisfactory operation this angle may be varied between 30° to 60°.

At the inner portion of the seal 67, plates 75, parallel to plates 74 and similarly spaced, form half-size buckets 76 and 77, juxtaposed in an allochiral relationship. Each half bucket has a quarter-circular inner surface formed transversely by a half of a row surface 68, the quartercicular surface extending from the outer edge 80, forming the lowest surfaces of the rows 68, to the inner or highest points 81 of the semicircular row surface. The plates 75, in forming the half-size buckets 76 and 77, thus form pairs of quarter-circular buckets rather than semicircular buckets, such as 73. In effect, 90° segments have been cut out of the first two transverse rows of inner buckets to provide alternate pairs of air lead-in passages 82 and 84, also arranged in allochiral relationship in the rows 68.

In operation, when the impellers 19 are supplying sufficient air to the underside of the vehicle 10 between it and the surface over which it is to be airborne, the vehicle is lifted to a position above the surface and is thus easily movable without friction. The embodiment shown in FIG. 1 is designed to be propelled and steered by jet action by the opening of any pair of flaps whereby air from the underside of the vehicle is discharged so as to move the vehicle in the direction opposite to the flow of the air. For example, if it is desired to cause the vehicle to move directly forwardly, the handle 40 is moved forwardly, the ball 41 pivoting in its seat 42 and moving the block cam 43 rearwardly. As may be best seen in FIG. 3, when the block 43 is moved directly to the rear there is no effect upon the cam followers 44, 47, 50 and 51. However, the cam followers 48 and 49 are permitted to move rearwardly, but this movement is of no operative effect as it merely tends to permit the bell cranks *h* and *e* to more tightly hold the flaps H and E in their closed position. However, the rearward movement of the cam 43 causes the cam followers 53 and 52 to be moved rearwardly so as to move the outer arms of bell cranks *a* and *d* away from each other and against the force of spring 54 so as to loosen the wires 61 and 62 between the respective flaps A and D. The latter flaps are then free to open to the extent of the loosening of the wires and are forced open by the air pressure under them. Thus, when flaps A and D are opened, a jet effect is created to the rear of the vehicle and the vehicle is forced to move forwardly. Similarly, the corresponding jets around the four sides of the operator's seat may be opened to reverse the direction and cause the vehicle to turn, depending upon the combination of the flaps opened.

As the pressure is created by the impellers on the underside of the vehicle, the air tends to escape from between the underside and the surface over which the vehicle is suspended, moving in the direction toward the peripheral edges. The seal 67 receives the escaping air through the respective lead-in passages 82 and 84, as shown by the air paths 86 and 87. The lead-in passages cause the formation of strong, stable air vortexes generated in complementary, oppositely rotating pairs, such as 88 and 89. Thus, each vortex is formed in the seal after it enters the lead-in passages and follows a spiral path developed on the semicircular surface of the rows 68 while in the first two half-size buckets and lead-in passages of each row 68. The number of transverse rows required for the lead-in passages is determined by the minimum number of such rows at which the vortexes form properly.

The lower limit of the spiral is the surface over which the vehicle is suspended and the upper limit of its travel is the curved surface in each bucket 76, 77 or 73. In other words, once a vortex has been formed there is a continual path from the ground or water surface into the buckets until the vortex leaves the underside of the vehicle. Thus, the radii of the semicircular buckets are about equal to the design lift height of the vehicle, half of a vortex in a transverse plane moving in a bucket and the other half moving outwardly thereof to contact the ground surface and return into the next bucket on its way toward the peripheral edge.

It has been found that by sharpening the lower edges of the plates and the intersection of the semicircular rows, forming edges 80, a minimum interference of the oppositely rotating vortical flow patterns is achieved. As the leaking air moves in its vortical paths, the energy consumed greatly reduces the leakage for a given lift height, and each vortex supplements and augments the vortex on each side of it in a manner so as to provide the greatest possible resistance to the escaping air.

From the foregoing disclosure, it is apparent that peripheral seals for ground effect vehicles may be made in various forms to create energy consuming escape air flow paths without departing from the inventive principles of the present invention.

We claim:

1. In an air suspension vehicle having means to provide a flow of air from an upper portion thereof through the vehicle to its lower side above the surface over which it is to be suspended, a dynamic seal to reduce the leakage rate of air from between said surface and the underside of said vehicle to the periphery thereof, said seal comprising: means substantially coextensive with the underside periphery of said vehicle for forming alternate, oppositely rotating vortexes in air moving outwardly from the underside of said vehicle, said means having downwardly facing concave surfaces.

2. In an air suspension vehicle having means to provide a flow of air from an upper portion thereof through the vehicle to its lower side above the surface over which it is to be suspended, a dynamic seal to reduce the leakage rate of air from between said surface and the underside of said vehicle to the periphery thereof, said seal comprising: means on the underside of said vehicle substantially coextensive with and adjacent its periphery for forming alternate, oppositely rotating vortexes in air adjacent said periphery and moving outwardly from said underside of said vehicle, said means adapted to guide said vortexes outwardly from the underside of said vehicle.

3. In an air suspension vehicle having means to provide a flow of air from an upper portion thereof through the vehicle to its lower side above the surface over which it is to be suspended, a dynamic seal to reduce the leakage rate of air from between said surface and the underside of said vehicle to the periphery thereof, said seal comprising: means including upwardly extending re-entrant portions having downwardly facing concave surfaces and being on the underside of said vehicle adjacent and substantially coextensive with its periphery for forming alternate, oppositely rotating vortexes in air moving outwardly from said underside of said vehicle.

4. In an air suspension vehicle having means to provide a flow of air from an upper portion thereof through the vehicle to its lower side above the surface over which it is to be suspended, a dynamic seal to reduce the leakage rate of air from between said surface and the underside of said vehicle to the periphery thereof, said seal comprising: upwardly and outwardly extending re-entrant portions on the underside of said vehicle adjacent its periphery for forming alternate, oppositely rotating vortexes in air moving outwardly from said underside of said vehicle, said portions being in substantial alignment following the contour of said periphery and being in rows extending outwardly toward said periphery.

5. In an air suspension vehicle having means to provide a flow of air from an upper portion thereof through the vehicle to its lower side above the surface over which it is to be suspended, a dynamic seal to reduce the leakage rate of air from between said surface and the underside of said vehicle to the periphery thereof, said seal comprising: upwardly and outwardly extending re-entrant bucket portions on the underside of said vehicle adjacent its periphery, said portions being in substantial alignment following the contour of said periphery and being in rows extending outwardly toward said periphery; means at the inner ends of said rows relative to said periphery to direct air moving outwardly from said underside into rows of said portions for forming in alternate rows, oppositely rotating vortexes moving toward said periphery.

6. In an air suspension vehicle having means to provide a flow of air from an upper portion thereof through the vehicle to its lower side above the surface over which it is to be suspended, a dynamic seal to reduce the leakage rate of air from between said surface and the underside of said vehicle to the periphery thereof, said seal comprising: upwardly and outwardly extending re-entrant bucket portions on the underside of said vehicle adjacent its periphery and substantially coextensive therewith, said portions being in substantial alignment following the contour of said periphery and being in rows extending outwardly toward said periphery, said portions having concave-shaped surfaces facing downwardly toward said surface over which the vehicle is to be suspended; and means at the inner ends of said rows relative to said periphery to direct air moving outwardly from said undeside into rows of said portions for forming in alternate rows, oppositely rotating vortexes moving toward said periphery.

7. In an air suspension vehicle having means to provide a flow of air from an upper portion thereof through the vehicle to its lower side above the surface over which it is to be suspended, a dynamic seal to reduce the leakage rate of air from between said surface and the underside of said vehicle to the periphery thereof, said seal comprising: upwardly and outwardly extending re-entrant portions on the underside of said vehicle adjacent its periphery, said portions being in substantial alignment following the contour of said periphery and being in rows extending lengthwise outwardly toward said periphery, said portions having concave-shaped surfaces facing downwardly toward said surface over which the vehicle is to be suspended, said portions having parallel walls spaced by and extending downwardly and inwardly from said concave surfaces, said walls disposed transversely of the length of said rows; and means at the inner ends of said rows relative to said periphery to direct air moving outwardly from said underside into rows of said portions for forming in alternate rows, oppositely rotating vortexes moving toward said periphery.

8. In an air suspension vehicle having means to provide a flow of air from an upper portion thereof through the vehicle to its lower side above the surface over which it is to be suspended, a dynamic seal to reduce the leakage rate of air from between said surface and the underside of said vehicle to the periphery thereof, said seal comprising: upwardly and outwardly extending re-entrant portions on the underside of said vehicle adjacent its periphery, said portions being in substantial alignment with the portions on either side thereof and being in rows extending outwardly toward said periphery, said portions having semicircular-shaped surfaces facing downwardly toward said surfaces over which the vehicle is to be suspended, said portions having parallel walls spaced by and extending downwardly and inwardly from said semicircular surfaces, said walls being semicircular segments and being inclined inwardly between 30° and 60° from the horizontal; the first pair of portions at the inner end of substantially all of said rows being in the form of quarter segments having quarter-segment walls and having a quarter-segment passage formed in one-half of said portions to permit outward flow therethrough; and each of said first pair of portions being in allochiral relationship with respect to the portion immediately on either side of it.

References Cited in the file of this patent

FOREIGN PATENTS 1,238,499   France ------------------ July 4, 1960

OTHER REFERENCES

"Symposium on Ground Effect Phenomena," presented October 21–23, 1959, published by Princeton University, Department of Aeronautical Engineering, Princeton, N.J., pages 15 and 111–118 relied on, classified in the Patent Office Library under TL–574–G7P7.

"Basic Principles of Ground Cushion Devices," presented at the SAE Annual Meeting, January 11–15, 1960, page 23 relied on.